Sept. 4, 1956 F. R. HARRIS 2,761,409
WATER-BORNE AIRPLANE TERMINAL
Filed Oct. 14, 1953 2 Sheets-Sheet 1
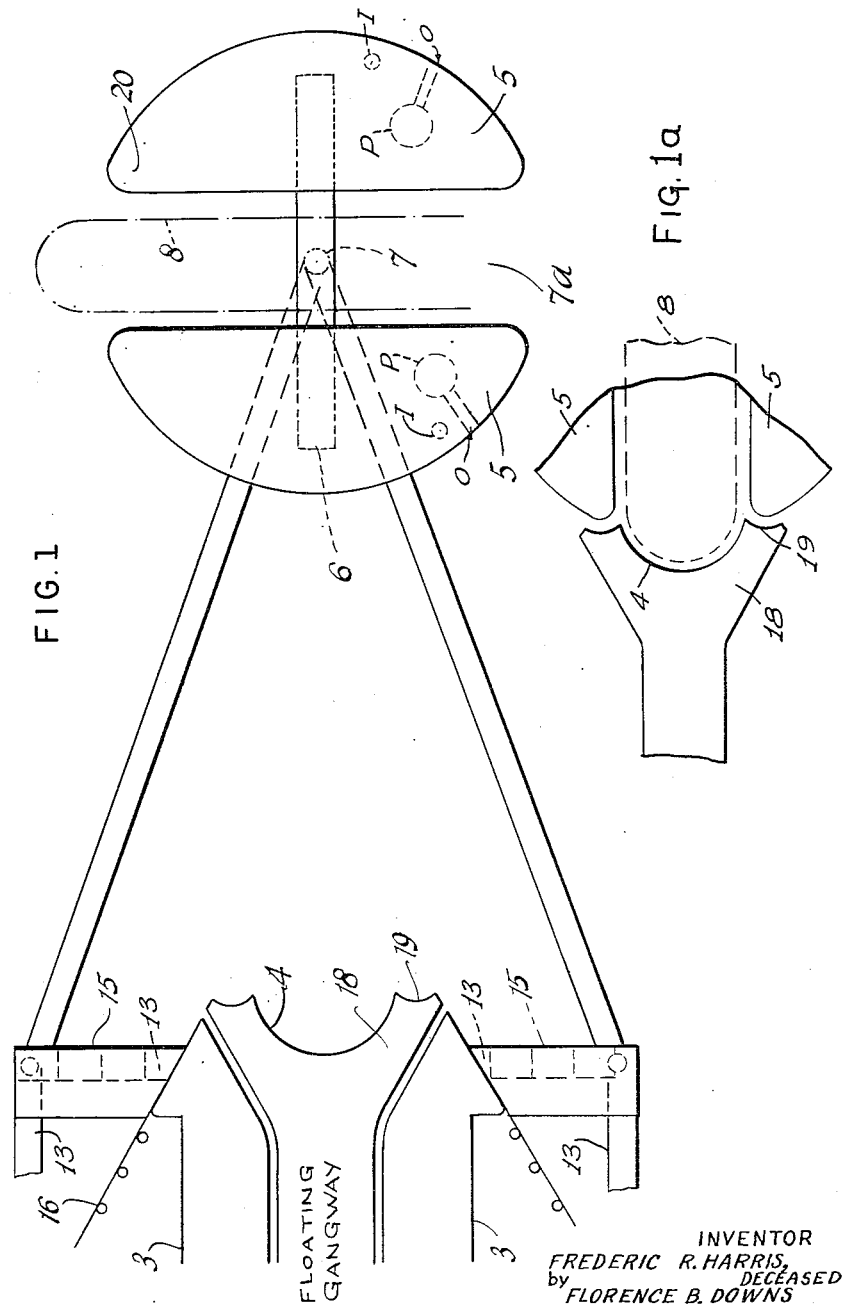
INVENTOR
FREDERIC R. HARRIS,
by DECEASED
FLORENCE B. DOWNS
MICHAEL S. LOBENTHAL
& MONROE PERCY BLOCH,
EXECUTORS
BY
William F. Nickel
ATTORNEY Sept. 4, 1956 F. R. HARRIS 2,761,409
WATER-BORNE AIRPLANE TERMINAL
Filed Oct. 14, 1953 2 Sheets-Sheet 2
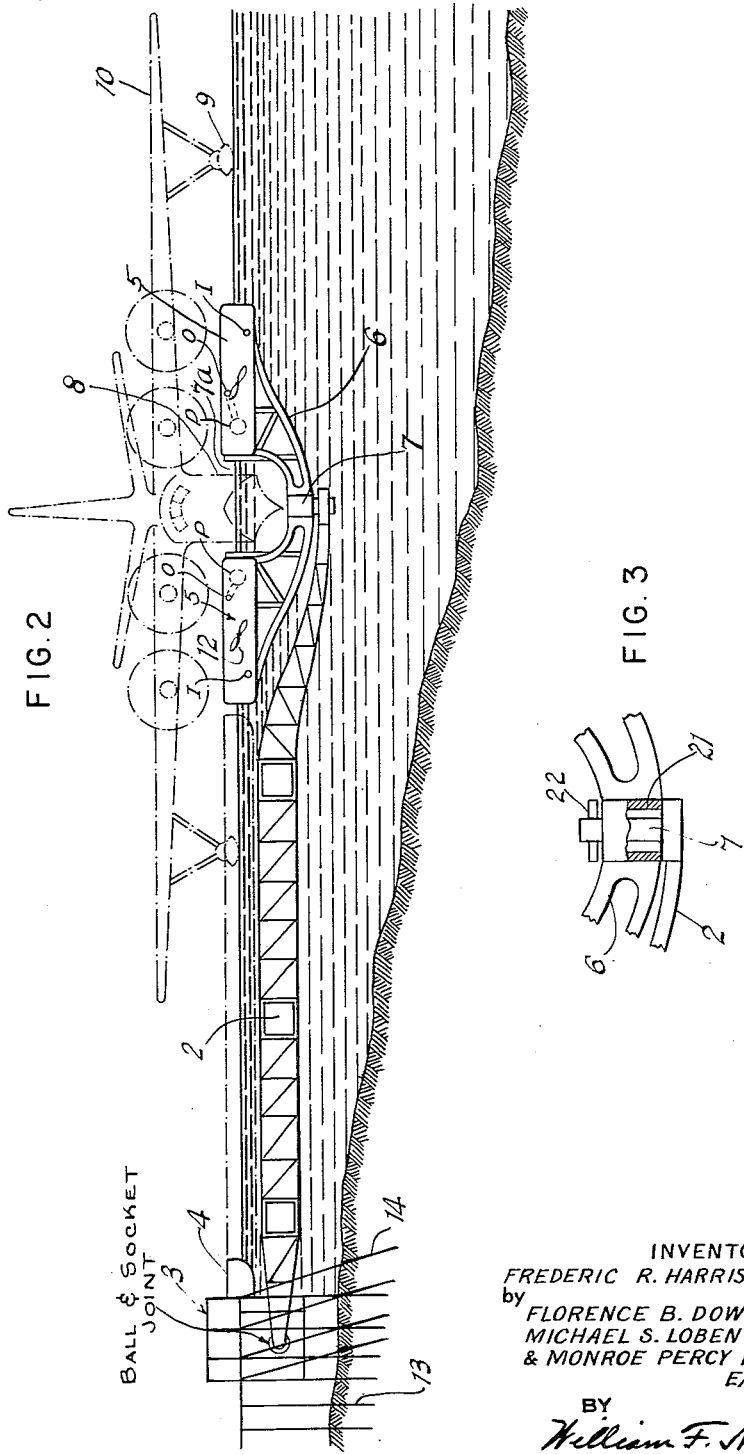
INVENTOR
FREDERIC R. HARRIS, DECEASED
by
FLORENCE B. DOWNS
MICHAEL S. LOBENTHAL
& MONROE PERCY BLOCH,
EXECUTORS
BY
William F. Nickel
ATTORNEY

United States Patent Office 2,761,409
Patented Sept. 4, 1956

2,761,409

WATER-BORNE AIRPLANE TERMINAL

Frederic R. Harris, deceased, late of New York, N. Y., by Florence B. Downs, Michael S. Lobenthal, and Monroe Percy Bloch, executors, all of New York, N. Y., assignors to Frederic R. Harris, Inc., New York, N. Y., a corporation of New York Application October 14, 1953, Serial No. 386,026

1 Claim. (Cl. 114—43.5)

This invention relates to an improvement in marine terminals which are adapted to be maintained on the surface of a body of water near the shore, for planes which can light directly on water and take off therefrom.

The main object of the invention is to provide a terminal having means for connecting it to a landing stage at the shore of the water, such as a pier or wharf, and a construction which forms a berth or slipway which the aircraft can enter when it is afloat from any direction after alighting. The berth is mounted so that it can be turned to any position so that the plane can taxi straight into the terminal.

The ensuing description sets forth clearly the nature of the invention and the drawings illustrate the preferred form thereof. But the structure shown herein is by way of example only and changes in minor respects may be adopted without going beyond the combinations of parts defined in the appended claims.

On the drawings:

Figure 1 is top plan showing a terminal according to this invention;

Figure 1a shows portions of the terminal in position for connection with the nearby shore.

Figure 2 is a side view of the same; and

Figure 3 is a view of a detail.

This application is a continuation in part of the inventor's prior application Serial No. 610,749, filed August 14, 1945, now abandoned.

The terminal is indicated as a whole by the numeral 1, and embraces a pair of beams 2 (shown in outline only in Figure 1) by which it is secured in the desired position offshore. These beams or mooring means have a journal or other pivotal connection with the terminal at one end and with a fixed abutment adjacent the shore at the other end; so that the said terminal may rise and fall with the tide or according to the weight or load carried by same. The beams or members 2 extend a selected distance from a pair of abutments, such as wharves or piers 3 on or adjacent the shore, and between the piers 3 is a long buoyant floating member 4, which is usually in retracted position between the piers 3 and can be moved out to serve as a bridge or gangway, preferably floating on the water, to connect the terminal to the shore. The beams 2 have the form of trusses with longitudinal stringers connected by cross braces.

The berth for the plane is formed by two side structures 5 connected underwater by a truss frame member 6. The beams 2, preferably two in number, are rigidly united at one end under the frame 6 and there carry the pivot 7 for the member 6. The beams 2 thus provide a member operating directly for rotatably mounting the parts 5 and 6, and frame 6 has only vertically movable connection with the piling or framework of the two shore piers 3. The members 5 are pontoons which are hollow and buoyant, with inlets and outlets, with pumps and operating apparatus such as are installed in floating dry docks, so that water can be admitted and discharged at will; as indicated at I, O and P respectively in Figures 1 and 2. The frame 6 curves down somewhat beneath the two pontoons 5 so as to allow a space 7a between these pontoons to receive the body of the plane when it comes to a stop between them. The pontoons 5 may be flooded and sunk so that the plane is not lifted clear of the water when it comes to rest with its body in the berth 7a and its floats 9 under the wings are still in the water. The tops of the pontoons 5 are high enough, however, to be level with the doors and hatchways of the plane. The wings 10 can be lashed to the pontoons 5. Any suitable means, such as propellers 12 mounted for pushing or pulling, on the pontoons 5, can be employed to turn this type of terminal platform so that the nose of the plane can be brought into line with the berth before the bridge is moved to abut the ends of the pontoons. The plane is lifted out of water for repairs by pumping out the pontoons 5, and of course can be loaded and unloaded either in raised position, or afloat, as shown in Figure 2. The two pontoons 5 thus constitute a turntable, into which the plane may be received; and the beams constitute a support for the pontoons 5 and member 6. The propellers of the plane can also be utilized to rotate the pontoons 5 and member 6.

The beams 2 at their ends adjacent the shore may have ball and socket joints uniting the beams at points of securement with the piles 13, a number of which are employed in the building of the piers 3. These piles 13 are braced where necessary by diagonal piling 14 and carry horizontal beams at the tops indicated at 15, constituting the abutments to which beams 2 are thus joined. The adjacent ends of the beams 2 may be connected by the ball and socket joints to piles 13 as will be understood. At the ends of each pier 3 is a line of stakes or piles 16 in a diagonal position which may be united by planking or any other form of covering, if desired. The ball and socket joints at the ends of the beams 2 also do not permit the turntable to swing sidewise or be swayed by wind or wave action. The beams 2 thus form a cooperating member rotatably supporting the member 6 and pontoons 5. The member 6 has a deep vertical recess in its upper edge, so that the space 7a always affords sufficient draft for the plane therein.

In practice, when a sea plane lands near a terminal, the turntable comprising the united pontoons 5 is revolved to move the slipway 7a into line with the direction of approach of the plane; which then taxies into position, bringing its hull or body into the berth between the pontoons 5, with the hull 8 projecting somewhat beyond the platform 5, as indicated in Figure 1. The platform is then revolved to bring the slipway 7a into line with the bridge or gangway 4, which is then moved outward, floating on the water, until it reaches the pontoons. See Figure 1a. Preferably, the outer extremity of the bridge 4 is forked somewhat, having arms 18 with concave curved surfaces 19 at their outer ends to fit against the narrow curved ends 20 of the two pontoons 5, and receive the body 8 of the sea plane between them. The plane can then be loaded or unloaded, and the passengers and other contents can be moved over the gangway 4 between the piers and the pontoons in either direction for loading and unloading the plane 8.

From the foregoing description it will be apparent this sea plane terminal is well adapted to serve the required purpose and can be readily set up at any place where it may be needed.

The general combination of converging beams 2, base member and side walls 5, and floating gangway is not part of this invention, but is covered in the claims of the inventor's copending application Serial No. 386,021 filed on the same day as this application.

As indicated on Figure 3, the pivotal connection between the beams 2 and the frame 6 comprises a journal 7 affixed to the united end of the frames 2 at the junction thereof under the member 6; and the member 6 has a bearing 21 which is somewhat larger than the thickness of the pin 7. Hence if the beams 2 and pontoons 5 are depressed the frame 6 can rock on the journal 7 slightly, so that the pontoons 5 will float in horizontal flush positions. A locking pin 22 through the upper end of the journal 7 prevents displacement of the frame 6.

The invention having been described, what is claimed as new is:

A floating marine terminal for seaplanes comprising a pair of pontoons arranged side by side with a space between same to serve as a berth for receiving the hull of an aircraft between them, and a truss frame member under the pontoons and rigidly uniting them to each other, the upper part of said member having a deep downward extending recess between said pontoons, a pair of converging beams united at adjacent ends, a journal on said ends upon which said member is rotatably mounted, separate points of securement positioned laterally with respect to said journal, and means at the opposite ends of the beams pivotally anchoring said beams to said points of securement, for up and down vertical movement, said opposite ends being spaced apart and said means preventing lateral movement of said beams.

References Cited in the file of this patent

UNITED STATES PATENTS

| | | |
|---|---|---|
| 242,077 | Turnbull | May 24, 1881 |
| 1,320,180 | Short | Oct. 28, 1919 |
| 1,937,973 | Mayo | Dec. 5, 1933 |
| 2,133,721 | Seidman | Oct. 18, 1938 |
| 2,501,310 | Burke | Mar. 21, 1950 |

FOREIGN PATENTS

| | | |
|---|---|---|
| 5,889 | Great Britain | Dec. 28, 1883 |
| 42,279 | Norway | Dec. 28, 1925 |
| 480,923 | Great Britain | Mar. 2, 1938 |